United States Patent [19]

Allen et al.

[11] Patent Number: 4,956,650

[45] Date of Patent: Sep. 11, 1990

[54] PATTERN GENERATION SYSTEM

[75] Inventors: Paul C. Allen, Beaverton; Robin Teitzel, Portland; Timothy Thomas, Lake Oswego, all of Oreg.

[73] Assignee: ATEQ Corporation, Beaverton, Oreg.

[21] Appl. No.: 237,753

[22] Filed: Aug. 26, 1988

[51] Int. Cl.$^5$ .............. G01D 15/16; H04N 1/21; G02B 3/04; A61N 5/00
[52] U.S. Cl. .................. 346/108; 350/433; 250/492.1; 358/298
[58] Field of Search ........... 346/108, 107 R, 160; 350/433, 434, 437; 250/492.1, 492.2; 358/298

[56] References Cited
U.S. PATENT DOCUMENTS

| | | | |
|---|---|---|---|
| 3,974,507 | 8/1976 | Chemelli | 346/108 |
| 4,700,201 | 10/1987 | Sato | 358/298 |
| 4,727,430 | 2/1988 | Miwa | 358/298 |
| 4,796,038 | 1/1989 | Allen et al. | 346/108 |

*Primary Examiner*—Mark J. Reinhart
*Attorney, Agent, or Firm*—Blakely, Sokoloff, Taylor & Zafman

[57] ABSTRACT

An improved pattern generation system. The pattern generation system of the present invention discloses an improved optical system for correcting problems of astigmatism and ellipticity in a radiant energy beam used for generating patterns on a workpiece. The present invention further discloses improved control circuitry for controlling modulation of said beams. The control circuitry corrects for problems of isofocal bias caused by non-linearities in the turn-on/turn-off of the beams.

11 Claims, 5 Drawing Sheets

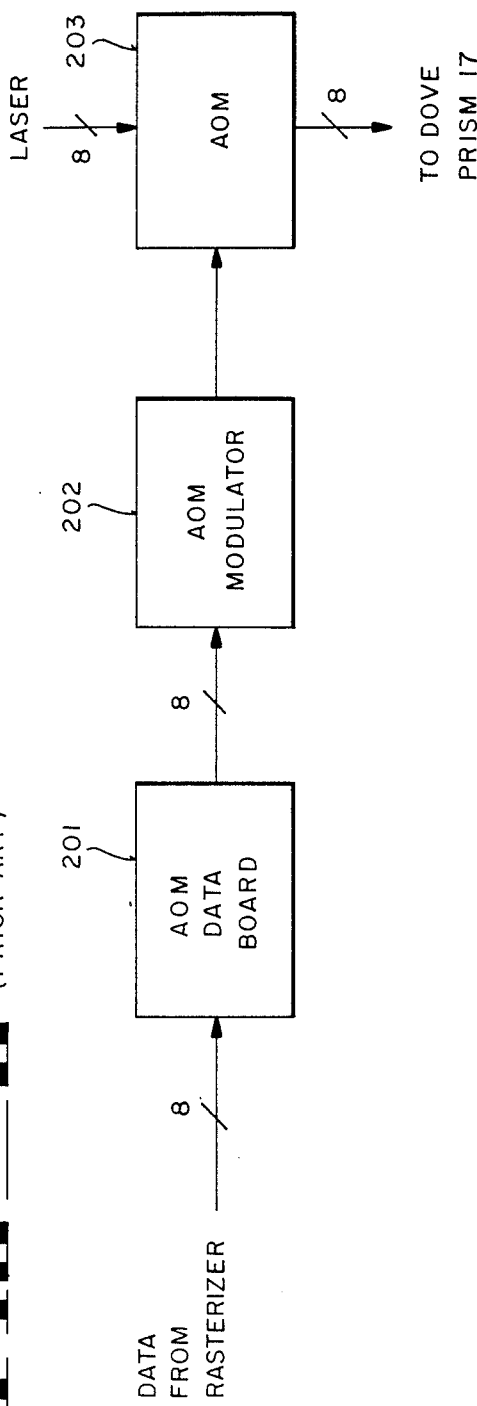
FIG_2 (PRIOR ART)
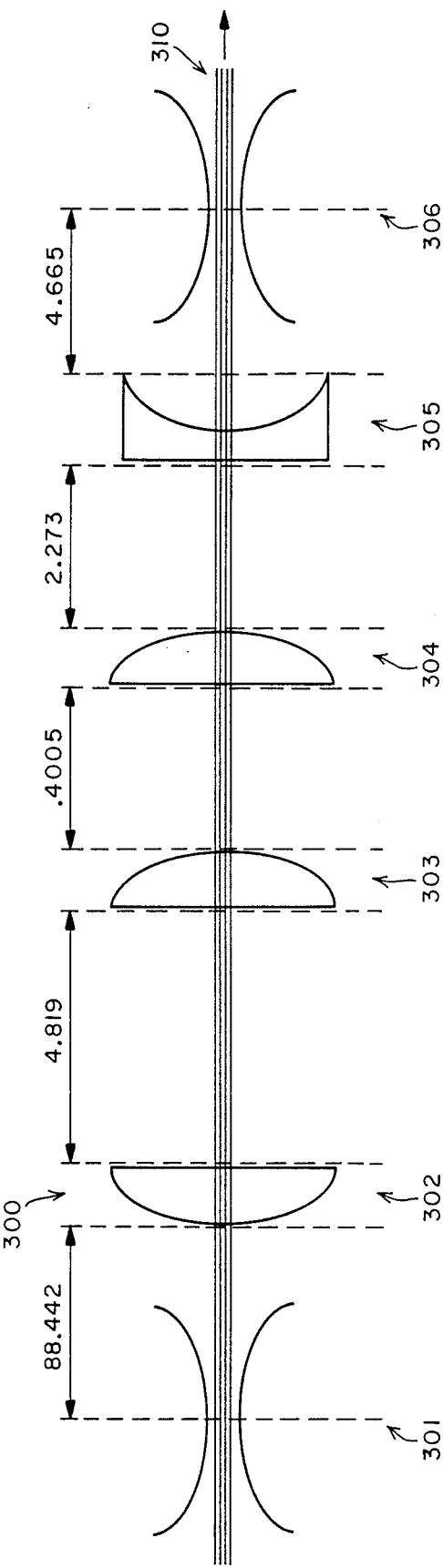
FIG_3

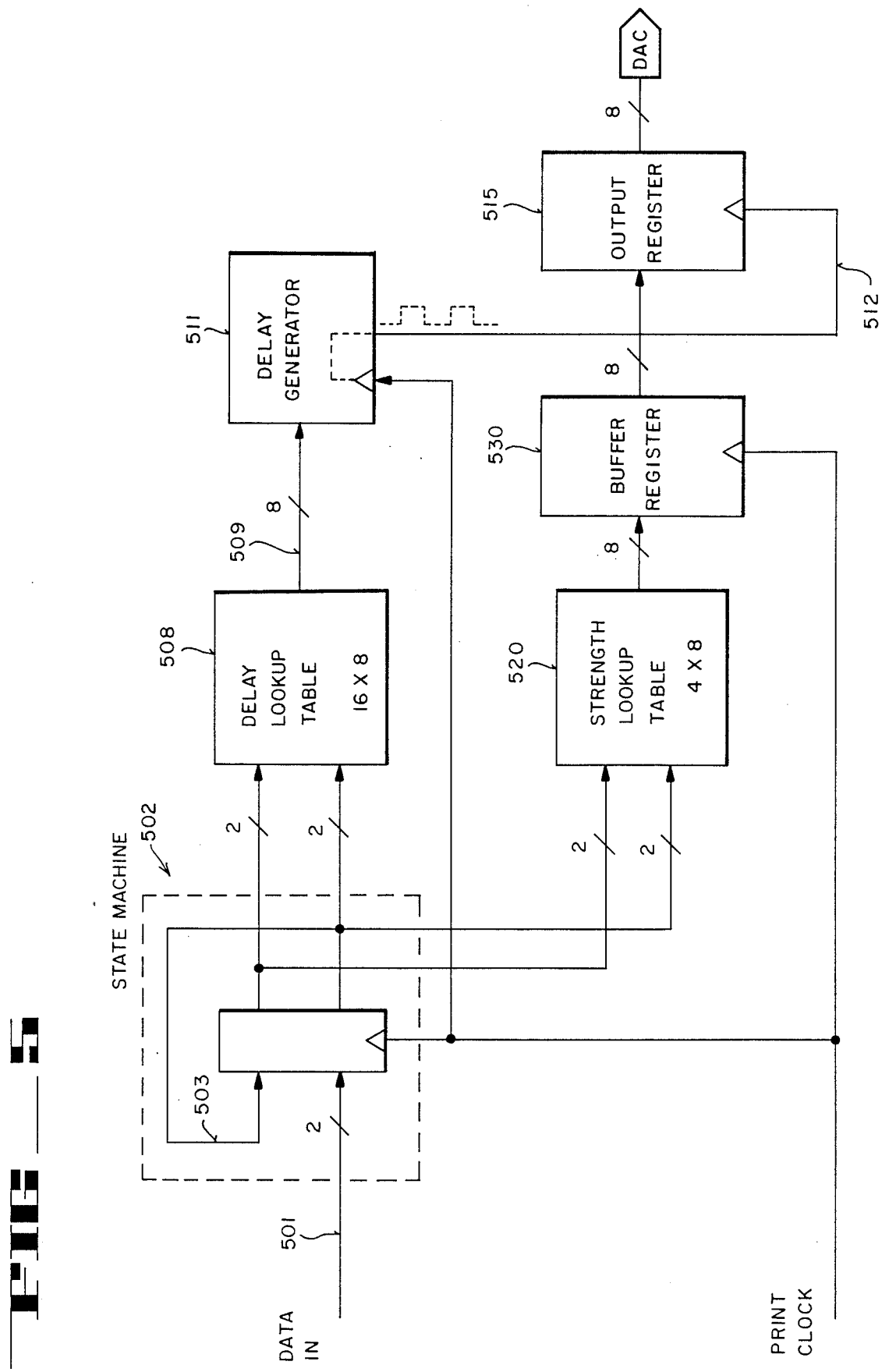

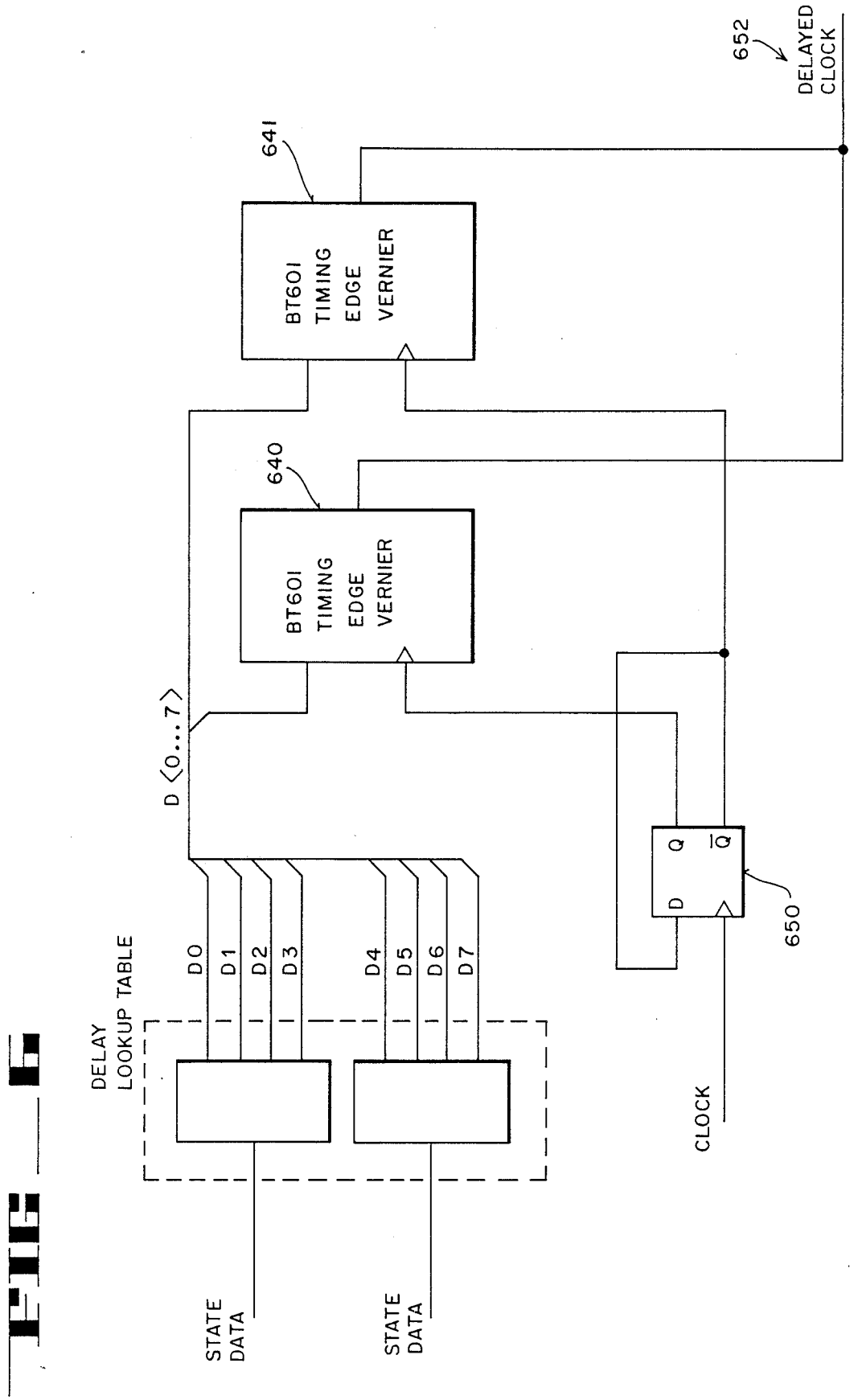
FIG_5

1

PATTERN GENERATION SYSTEM

BACKGROUND OF THE INVENTION

1. Field of the Invention

The present invention relates to the field of systems for directing radiant energy and, more specifically, to the field of apparatus for correcting astigmatism, isofocal bias and ellipticity in a laser optic system which directs a beam at a workpiece.

2. Prior Art

The preferred embodiment of the present invention is designed to correct problems of astigmatism, isofocal bias and ellipticity in a pattern generation apparatus such as the pattern generation system commercialized by Ateq Corporation of Beaverton, Oregon, the assignee of the present invention, under the trademark CORE-2000.

The CORE-2000 pattern generation apparatus has been described, as the preferred embodiment, in a number of the United States patent applications including copending applications Ser. No. 178,868, now U.S. Pat. No. 4,796,038 entitled "A Laser Pattern Generation Apparatus", filed Mar. 28, 1988, assigned to the assignee of the present invention, which is a continuation of application Ser. No. 867,205, entitled "Laser Pattern Generation Apparatus", filed May 27, 1986, also assigned to the assignee of the present invention, now abandoned, which is a continuation of application Ser. No. 758,344, entitled "Laser Pattern Generation Apparatus", filed July 24, 1985, also assigned to the assignee of the present invention, now abandoned, and in copending application Ser. No. 784,856, entitled "Rasterizer For Pattern Generator", filed Oct. 4, 1985, and assigned to the assignee of the present invention.

The CORE-2000 pattern generation system and the above-mentioned patent applications are the most pertinent prior art known to the Applicant.

In addition, the Applicant is aware of U.S. Pat. No. 4,318,594 Hanada which describes a beam shaping optical system for treating diverging beams emitted from a semiconductor laser, U.S. Pat. No. 4,203,652 Hanada also for treating diverging beams emitted from a semiconductor laser, U.S. Pat. No. 3,974,507 Chemelli, et al. which describes an adjustable compact array of optical components which are relatively insensitive to beam steering and filamentation affects of the laser. Chemelli, et al. discloses that the optical output beam of the disclosed laser exhibits astigmatism and an elliptical cross section. Further, the Applicant is aware of U.S. Pat. No. 3,396,344 Broom which describes a semiconductor laser structure comprising a solid state laser formed by a block of semiconductor material containing a P-N junction layer having two opposite AND faces optically polished flat and parallel to one another as resonator reflectors, one of said AND faces being a radiation emitting surface when the laser is excited, in combination with a described collimating lens and a plano-cylindrical lens.

It is an object of the present invention to develop methods and apparatus for correcting problems of astigmatism, isofocal bias and ellipticity in a pattern generation apparatus.

SUMMARY OF THE PRESENT INVENTION

The present invention discloses means for correcting astigmatism, isofocal bias and ellipticity problems in a pattern generation system having a source for generating a radiant energy beam. The radiant energy beam is used for generating a pattern on a workpiece.

The improvement comprises an optical system for compensating for astigmatism and ellipticity problems of the pattern generation system. The optical system of the preferred embodiment comprises four lenses displaced between the source of the radiant energy beam and the workpiece. Specifically, the four lenses are displaced between the source of the radiant energy beam and a beam splitter. The beam splitter is used to split the radiant energy beam into a plurality of beams.

As a second aspect of the present invention, circuitry is provided for controlling a modulation means. The modulation means controls presentation of individual radiant energy beams, after the original beam has been split into a plurality of beams, to the workpiece. The disclosed circuitry is utilized to correct problems of isofocal bias in the pattern generation system.

The circuitry comprises a delay generation means for delaying a clock signal used to control an intensity level generation means. The intensity level generation means is used to control the intensity level of the individual beams. The delay generation means comprises a state machine for receiving as input intensity data and providing as output state data. The delay generation means further comprises a delay look-up table for storing delay values and a delay generator for generating a delayed clock signal.

BRIEF DESCRIPTION OF THE DRAWINGS

FIG. 2 is a block diagram illustrating a known system for supplying acoustic optical modulation data to a pattern generation system as may be utilized by the present invention.

FIG. 3 is a block diagram illustrating an optical lens system as may be utilized by the present invention.

FIG. 5 is a schematic diagram of a circuit as may be utilized by the present invention.

FIG. 6 is a schematic diagram of a portion of the circuit shown in FIG. 5.

DETAILED DESCRIPTION OF THE PRESENT INVENTION

Figure 1:
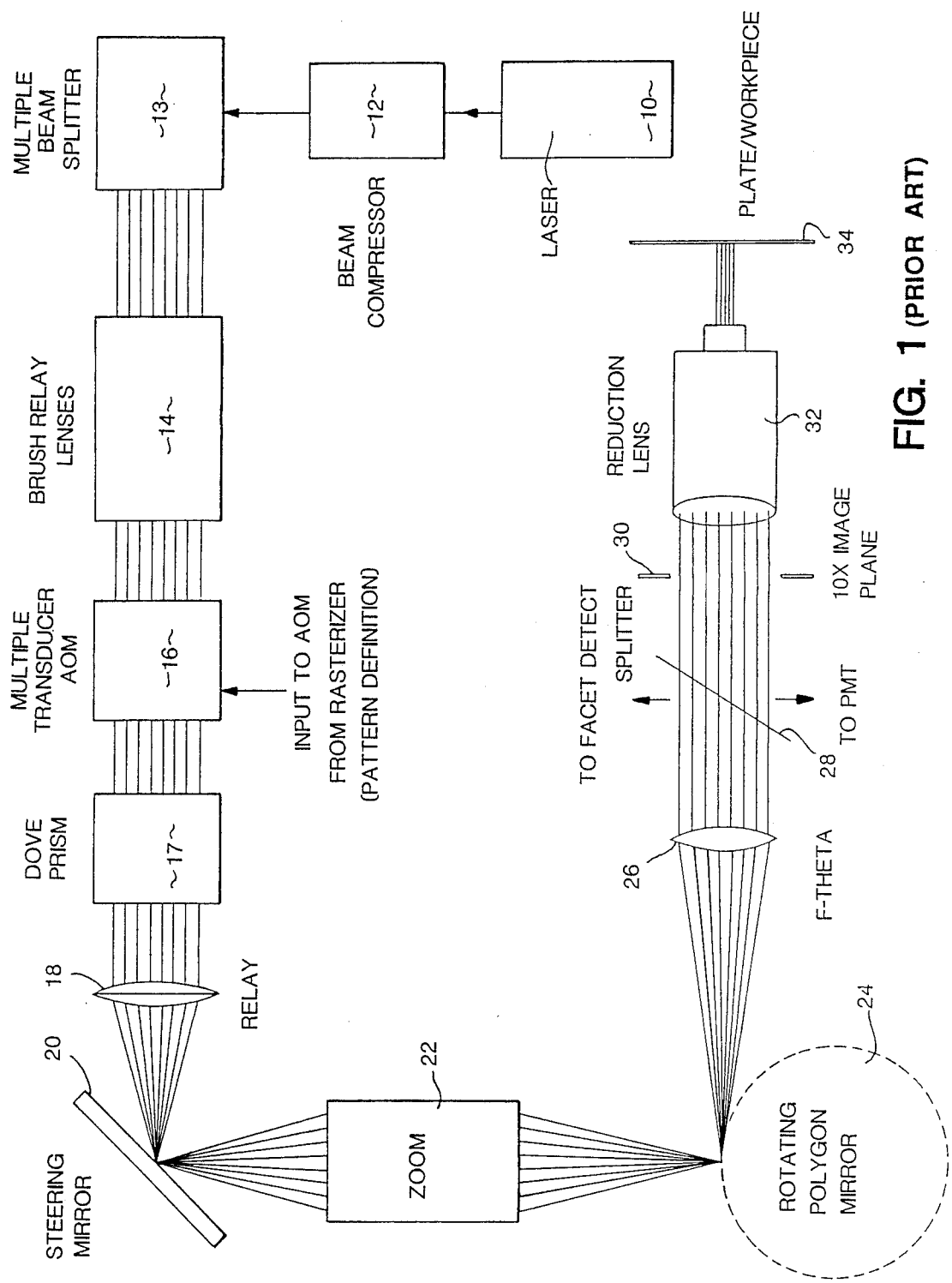
FIG. 1 is an optical schematic diagram showing the overall optical path in a known pattern generation apparatus as may be utilized by the present invention.

An optical stigmator and circuit for controlling activation of beams is described. In the following description, numerous specific details are set forth such as lens characteristics, number of bits in data fields, etc., in order to provide a thorough understanding of the present invention. It will be obvious, however, to one of ordinary skill in the art that the present invention may be practiced without these specific details. In other instances, well-known circuits, structures and techniques have not been shown in detail in order not to unnecessarily obscure the present invention.

OVERVIEW OF THE PRESENT INVENTION

The present invention relates generally to systems for providing a beam of radiant energy onto a image plane. In such systems, it is desirable to provide for consistent and predictable results in the focus of the beam on the image plane. However, in known systems, the beam may suffer from one or more of a number of undesirable characteristics including astigmatism, beam ellipticity and isofocal bias.

One such known system is the CORE-2000 pattern generation system: manufactured by Ateq Corporation of Beaverton, Oreg., the assignee of the present invention. Systems, such as the CORE-2000 pattern generation system, suffer from problems of astigmatism in production of workpieces, especially as the geometries of objects to be drawn on such workpieces becomes smaller and smaller. As the Applicant currently understands the problems of astigmatism in systems embodying radiant energy focusing devices, such as the CORE-2000 pattern generation system, such problems arise from misadjustment of the focus of the beam. Specifically, in the preferred embodiment of the present invention, such astigmatism appears to be caused by the optical focus height of the beams in the scan direction being different from the optical focus height of the beams in the stripe direction.

The terms "scan direction" and "stripe direction", as used herein, refer to the directions along the scan axes and stripe axes as described in the Applicant's earlier referenced copending application Ser. No. 178,868. The scan direction may be thought of as the direction of movement of the radiant energy beams and the stripe direction may be thought of as the direction of movement of the workpiece during a write operation.

Further, systems, such as the CORE-2000 pattern generation system, suffer from problems of apparent beam ellipticity whereby the spot size, as inferred from the printed pattern, is different in the scan direction at best scan direction focus from the spot size in the stripe direction at best stripe direction focus. Ellipticity causes a critical dimension bias between the stripe and scan directions at exposures other than the isofocal exposure. The isofocal exposure is the exposure level at which neither scan direction nor stripe direction CD's vary with focus.

Such ellipticity may be caused by the beam source, such as a laser in the CORE-2000 pattern generation system, by the acousto-optical modulator (AOM) or by some other source.

Further, in the presently available commercial embodiment of the CORE-2000 pattern generation apparatus, circuitry is employed to accept data from a rasterizer which defines patterns to be formed on a workpiece and to control beams for writing on the workpiece. The circuitry is described in more detail with reference to copending application Ser. No. 784,856. The beams of the CORE-2000 pattern generation system comprise eight overlapping beams which form a brush for writing scan lines onto the workpiece. It is known that in such systems, the beams must be controlled such that a time delay occurs between the activation of each of the eight beams. If such control is not provided, uncontrolled interference of the beams may occur preventing a "clean" scan line. The CORE-2000 pattern generation apparatus employs circuitry comprising an AOM and an associated control circuitry to ensure the beams do not overlap even though the projection area of the beams may overlap. The method of ensuring non-overlapping beams employed by the CORE-2000 is for the AOM to provide time delay between activating each of the individual beams. This allows for the brush produced by the beams to form a clean scan line.

However, systems such as the CORE-2000 pattern generation apparatus further suffer from problems of isofocal bias, in which the critical dimension (CD) is slightly different in the scan direction than in the stripe direction at the isofocal exposure. The Applicant currently understands this CD bias to be due, at least in part, to non-linearities in the turn on/turn off cycle times of the beams directed at the workpiece.

Referring now to FIG. 1, an optical system as may be utilized by the presently available commercial version of the CORE-2000 as described in U.S. Pat. No. 4,796,038 Laser Pattern Generation Apparatus, assigned to assignee of the present invention, is shown. A continuous laser 10 provides 100 to 200 milliwatts of radiation at a frequency of 363.8 nm. The beam from the laser is compressed through an ordinary beam compressor 12 to prepare the beam for splitting. The beam compressor of the presently commercial available CORE-2000 pattern generation apparatus comprises two lenses. A beam splitter 13 splits the beam from the laser 10 into eight separate beams. These eight beams from the splitter (referred to collectively as the "brush") pass through a relay lens 14. The relay lens effectively focuses and shrinks the beams from the splitter 13. The beams are shrunk by approximately a factor of 2.

Commercially available acousto-optical modulators (AOMs) 16 are employed to modulate the light beams. The eight beams from the AOM are directed through a dove prism 17. The dove prism is used to rotate the brush and, in effect, tilt the beams out of the plane of FIG. 1. The ultimate brush formed by the beams comprises overlapping projections of each of the beams without interference between the beams since in addition to the rotation from prism 17, a time delay is used between activation of each of the beams. This time delay is created by circuitry in an AOM data board used to control the AOM.

The beams from prism 17 pass through a single relay lens 18 to converge to a spot on steering mirror 20. The steering mirror 20 is electrically controllable which permits the beam's angles to be moved (adjusted) on the facets comprising mirror 24. The beams reflecting from mirror 20 pass through a zoom lens 22 which permits the beams to be made larger and moved further apart or to be made smaller and moved closer together on the workpiece.

The rotating-polygon mirror 24 provides the scanning action of the beams.

An F-theta lens 26 is used to form a post-scan, intermediate image plane and provides the beams to reduction lens 32 to provide the final beams for exposure of the workpiece 34. A beam splitter 28 is disposed in the intermediate image plane. The beam splitter 28 is used to split one of the beams from the beam splitter 28 to a facet-detect circuit which provides a pulse for indicating facet position on the rotating-polygon mirror 24. This permits pattern data from the AOM 16 to be synchronized with the mirror rotation. A shutter 30 is also disposed in the intermediate image plane to prevent light from reaching the workpiece except during scanning of the workpiece or at other selected times, such as during calibration of the system.

The present invention introduces an improved optical system which replaces the present commercial embodiment of beam compressor 12. The improved optical system acts to correct problems of astigmatism and ellipticity which may be introduced by the laser 10, AOM 16 and dove prism 17. The present invention also discloses circuitry employed by the AOM data board to compensate for and correct isofocal bias.

As shown by FIG. 2, the CORE-2000 pattern generation system generates data in a rasterizer. The rasterizer of the preferred embodiment is disclosed in more detail with reference to copending application Ser. No. 784,856. Eight bits of data are received by eight AOM data boards 201, one bit per board. In the presently commercially available CORE-2000 pattern generation system the AOM data board 201 acts to delay presentation of data, received from the rasterizer, to the AOM modulator 202. The purpose of this delay is to correct for the eight beams not being parallel when a workpiece is scanned. The AOM modulator 202 then provides a signal to eight transducers formed on the surface of a single crystal. The presence of the signal determines whether the beam will be diffracted through the crystal onto the workpiece and further, the amplitude of the signal determines the intensity of the beam.

OPTICAL SYSTEM

The present invention discloses a new beam compressor comprising an optical system which replaces the two lenses in beam compressor 12 of FIG. 1. The optical system of the present invention acts to introduce a variable amount of compensating astigmatism and ellipticity to correct the astigmatism and ellipticity caused by the laser, AOM and dove prism. Although the present invention will be described with reference to an optical system as used by the preferred embodiment, it will be understood by one of ordinary skill in the art that alternate optical systems may be utilized which would correct for the above mentioned astigmatism and ellipticity problems. Such optical systems may, for example, use a combination of cylindrical lens, prisms and tilted plates.

Referring now to FIG. 3, the optical system 300 of the preferred embodiment is shown. The preferred embodiment of the present invention comprises four lenses, lens 302, 303, 304 and 305.

In this setting of the beam compressor, 6 inches of astigmatism is introduced at the beam compressor focus 310, the beam diameter at focus in the axis of cylinder power is 0.00908 inches, and the beam diameter at focus in the axis of no cylinder power is 0.01522 inches Lens 302 is set approximately 88.442 inches from the virtual waist of laser beam source 301. The laser wavelength is 364 nm; the waist diameter is 0.0413 inches. Lens 302 comprises a convex surface into which beam 310 enters and a planar surface from which beam 310 exits. The lens 302 has a refractive index of approximately 1.475 and the convex surface has a radius of approximately 2.001 inches. The lens is approximately 0.2000 inches thick at its thickest point.

A second lens 303 is displaced 4.819 inches from the planar surface of lens 302. Lens 303 has a planar surface into which beam 310 enters and a cylindrical convex surface through which beam 310 exits. Lens 303 has a refractive index of approximately 1.475 and its convex surface has a radius of approximately 1.357 inches. Lens 303 is approximately 0.2000 inches thick.

A third lens 304 is offset approximately 0.4005 inches from the convex surface of the second lens. The third lens 304 has a planar surface through which the beam 310 enters and a convex surface through which the beam 310 exits. The third lens 304 has a refractive index of approximately 1.475 and a radius of approximately 0.6024 inches. The third lens 304 is approximately 0.2000 inches thick.

A fourth lens 305 is offset approximately 2.2733 inches from the convex surface of the third lens 304. The fourth lens has a planer surface through which the beam 310 enters and a cylindrical concave surface through which the beam 310 exits. The fourth lens 305 has a refractive index of approximately 1.475 and is approximately 0.2000 inches thick. The fourth lens 305 has a radius of approximately 1.6280 inches. The fourth lens 305 is offset approximately 4.665 inches from the beam splitter 13 of FIG. 1.

Utilizing the above-described optical system, the preferred embodiment of the present invention compensates for problems of astigmatism and ellipticity in the beam 310 which are caused by the laser source 10, AOM 16, and dove prism 17 of FIG. 1. By varying the air space between lens elements 303 and 304 and between elements 304 and 305, varying amounts of astigmatism and ellipticity can be introduced at focus 310. The introduced astigmatism and ellipticity is transferred to the final image plane of the pattern generation apparatus.

Figure 4:
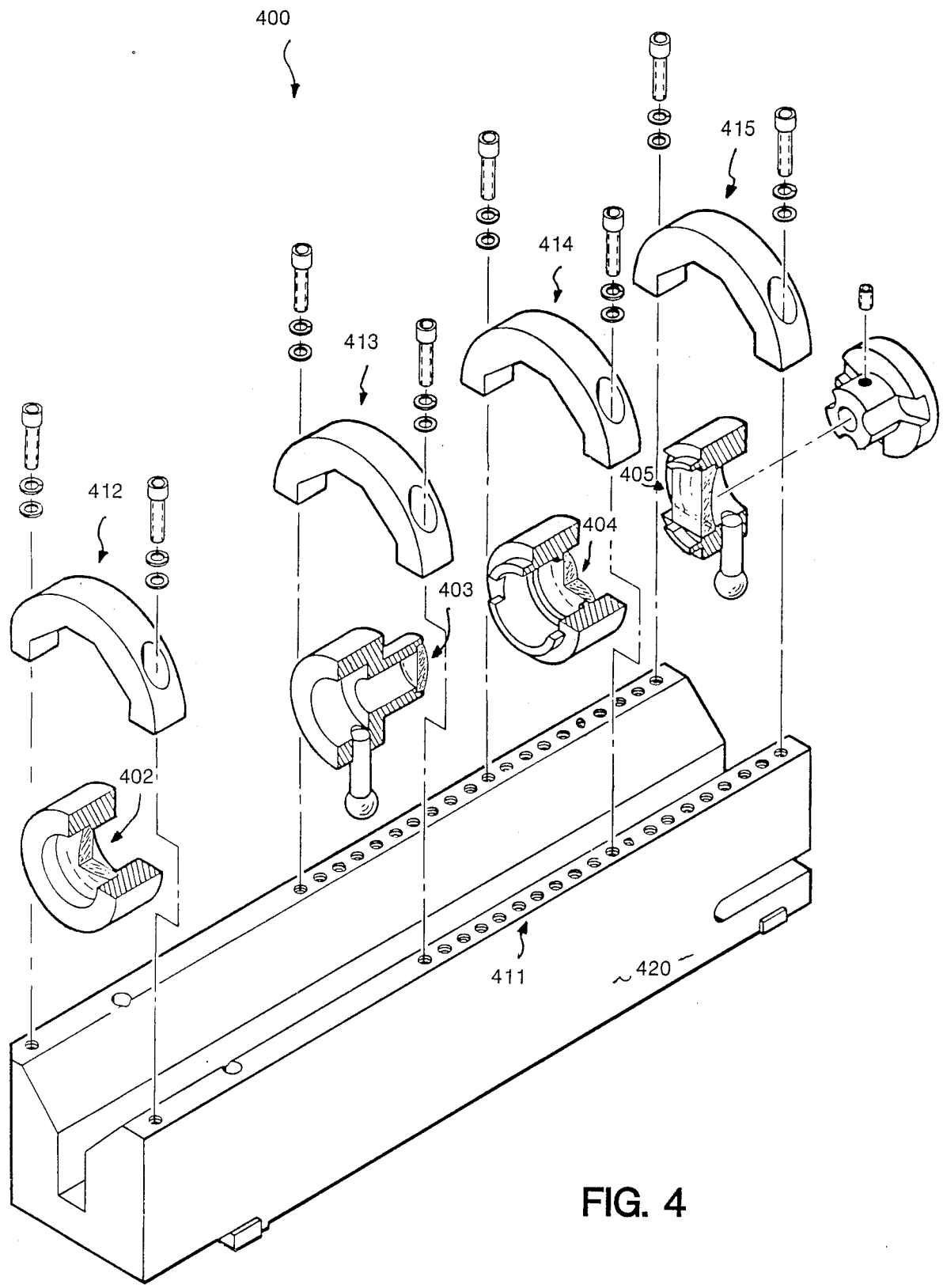
FIG. 4 is an exploded view of an optical lens assembly as may be utilized by the present invention.

Referring now to FIG. 4, an exploded view of the optical system of the preferred embodiment of the present invention is shown. The optical system 400 is displaced in the laser pattern generation system of FIG. 1 between the laser 10 and the beam splitter 13 at the location shown as the beam compressor 12 in FIG. 1. The optical system 400 comprises a base 420 having a plurality of locations 411 for coupling lens holders holding lenses 402, 403, 404 and 405. Lenses 402, 403, 404 and 405 correspond to lenses 302, 303, 304 and 305 of FIG. 3, respectively. In the preferred embodiment, each of the lenses 402, 403, 404 and 405 are attached to the base 420 by attachment means 412, 413, 414 and 415, respectively.

ACOUSTIC-OPTICAL MODULATOR CONTROL

The preferred embodiment of the present invention discloses circuitry for controlling the AOM 16 of FIG. 1. The preferred embodiment of the present invention employs circuitry utilized to delay presentation of data to the AOM from a rasterizer which corrects for the eight beams of the pattern generation system not being parallel as the workpiece is scanned. As an inventive feature of the present invention, further circuitry is employed to correct CD bias caused by non-linearities in the turn on/turn off of the beams.

Referring now to FIG. 5, the circuitry utilized to correct CD bias in the preferred embodiment is shown in block diagram form. Two bits of data are input on line 501 to state machine 502. The two bits of data input on line 501 indicate the desired intensity of the beam. Referring to Table 1, in one embodiment of the present invention one bit of the two bits of data input on line 501 is, effectively, ignored by the delay
circuitry. In this case, if the remaining bit is a 0, the beam intensity is interpreted as being off. If the bit value is a 1, the beam intensity is interpreted as being fully on.

TABLE I

| BIT VALUE | INTENSITY | NOMINAL STRENGTH LOOKUP TABLE VALUE |
| --- | --- | --- |
| 0 | OFF | 00 |
| 1 | FULL ON | FF |

In a second embodiment of the present invention, both bits input on line 501 are used in determining the intensity level of the beam. In this second embodiment, the bit values have the meanings indicated by Table II. The second embodiment allows for three levels of intensity: off, ½ intensity and full intensity. ½ intensity may be represented by either 01 or 10.

TABLE II

| BIT VALUE | INTENSITY | NOMINAL STRENGTH LOOKUP TABLE VALUE |
|---|---|---|
| 00 | OFF | 00 |
| 01 | ½ INTENSITY | 7F |
| 10 | ½ INTENSITY | 7F |
| 11 | FULL ON | FF |

In a third embodiment of the present invention, four intensity levels are available: off, ⅓ intensity, ⅔ intensity and full intensity. The bit values associated with each of these intensity levels for the third embodiment are listed in Table III.

TABLE III

| BIT VALUE | INTENSITY | NOMINAL STRENGTH LOOKUP TABLE VALUE |
|---|---|---|
| 00 | OFF | 00 |
| 01 | ⅓ INTENSITY | 55 |
| 10 | ⅔ INTENSITY | AA |
| 11 | FULL ON | FF |

The state machine 502 of FIG. 5 accepts as input the two bits of data on line 501 and the two bits of data which were presented on line 501 in the previous clock cycle. The two bits of data from the previous clock cycle are recycled on line 503. These four bits of data (i.e. two bits from the current clock cycle and two bits from the previous clock cycle) are used as input to delay lookup table 508. The state machine 502 of the preferred embodiment comprises an MC10H141 4-bit universal shift register.

Table IV illustrates the interpretations of each of the states which may be output from the state machine 502 for each of the three above-mentioned embodiments of the present invention.

In Table IV, B0 and A0 represent data from the current clock cycle and B1 and A1 represent data from the previous clock cycle. The column labeled "A0, A1 only" indicates the states in the first embodiment. The column labeled "10&01=½ intensity" represents the states for the second embodiment and the column labeled "01=⅓ intensity 10=⅔ intensity" illustrates the states for the third embodiment.

In the first embodiment, the B0 and B1 bits are effectively ignored and only the A0 and A1 bits are used to determine the state. For example, Hex values 0, 2, 8 and A are all stable off delay locations. Further, in the second embodiment, 10 and 01 both indicate the same strength. Therefore, as examples, Hex values 1 and 2 represent the same state, a transition from ½ intensity to off. In the third embodiment, each of the Hex values represents a different state.

TABLE IV

| HEX | BIT VALUE TO B0 A0 | BIT VALUE FROM B1 A1 | A0, A1 ONLY | 10 & 01 = ½ INTENSITY | 01 = ⅓ INTENSITY 10 + ⅔ INTENSITY |
|---|---|---|---|---|---|
| 0 | 0 0 | 0 0 | STABLE OFF | STABLE OFF | STABLE OFF |
| 1 | 0 0 | 0 1 | FALLING EDGE | ½ TO OFF | ⅓ TO OFF |
| 2 | 0 0 | 1 0 | STABLE OFF | ½ TO OFF | ⅔ TO OFF |
| 3 | 0 0 | 1 1 | FALLING EDGE | FULL TO OFF | FULL TO OFF |
| 4 | 0 1 | 0 0 | RISING EDGE | OFF TO ½ | OFF TO ⅓ |
| 5 | 0 1 | 0 1 | STABLE ON | STABLE ½ | STABLE ⅓ |
| 6 | 0 1 | 1 0 | RISING EDGE | STABLE ½ | ⅔ TO ⅓ |
| 7 | 0 1 | 1 1 | STABLE ON | FULL TO ½ | FULL TO ⅓ |
| 8 | 1 0 | 0 0 | STABLE OFF | OFF TO ½ | OFF TO ⅔ |
| 9 | 1 0 | 0 1 | FALLING EDGE | STABLE ½ | ⅓ TO ⅔ |
| A | 1 0 | 1 0 | STABLE OFF | STABLE ½ | STABLE ⅔ |
| B | 1 0 | 1 1 | FALLING EDGE | FULL TO ½ | FULL TO ⅔ |
| C | 1 1 | 0 0 | RISING EDGE | OFF TO FULL | OFF TO FULL |
| D | 1 1 | 0 1 | STABLE ON | ½ TO FULL | ⅓ TO FULL |
| E | 1 1 | 1 0 | RISING EDGE | ½ TO FULL | ⅔ TO FULL |
| F | 1 1 | 1 1 | STABLE ON | STABLE FULL | STABLE FULL |

The 4-bit value from the state machine 502 is input into the delay lookup table 508 as an address for looking up a delay value. In the preferred embodiment, the delay lookup table 508 comprises a 16×8 memory array for storing up to 16 8-bit delay values. The preferred embodiment of the present invention comprises two MC10H145 data RAMs. The value in the delay lookup table addressed by the four bits corresponding to any particular state is the delay value desired for that state. The delay value is output as an 8-bit value on Table V illustrates the time delays corresponding to a number of delay values which may be stored at address locations in the delay lookup table. For example, Hex value 0 at an address in the delay lookup table would provide for a delay in presentation of the output from the circuit of FIG. 5 of 0 picoseconds. A Hex value of 1 would provide for a delay of 58.8 picoseconds and a Hex value of FF produces a delay of 15.0 nanoseconds. It will be obvious to one of ordinary skill that alternate delay values may be utilized without departure from the scope and spirit of the present invention.

TABLE V

| DELAY LOOKUP TABLE VALUE | | DELAY |
|---|---|---|
| DECIMAL | HEX | |
| 0 | 0 | 0 pS |
| 1 | 1 | 58.8 pS |
| 2 | 2 | |
| 3 | 3 | |
| ... | ... | ... |
| 255 | FF | 15.0 nS |

The eight bits output on line 509 are input to a delay generator 511 for generating the delays of Table V. The delay generator of the preferred embodiment comprises a Brooktree 601 (Bt601) timing edge vernier. The delay generator 511 provides, as output, a pulse for clocking an output register 515 of the circuit of FIG. 5. The pulse is provided on line 512.

Referring briefly to FIG. 6, the preferred embodiment of the present invention comprises two Bt601 timing edges vernier circuits 640 and 641. The use of two Bt602 timing edge verniers in the preferred embodiment compensates for recovery time of these circuits. In the preferred embodiment, the Bt601 circuits are clocked by signals output from a DQ latch 650 Bt601 circuit 640 is clocked by the $\overline{Q}$ output of latch 650 and Bt601 circuit 641 is clocked by the $\overline{Q}$ output of the latch 650. The DQ latch 650 is clocked by the print clock. The delayed clock line 652, which corresponds with line 512 of FIG. 5, is provided with pulses alternatively from Bt601 circuit 640 and from Bt601 circuit 641.

Referring again to FIG. 5, a strength lookup table 520 stores the output intensity level associated with each state provided by the state machine. Referring again to Tables I, II and III, the present invention currently allows for three embodiments. In the first embodiment, shown by Table I, the strength lookup table values in each location in the strength lookup table are nominally set to either hexadecimal 00 indicating the beam is off or hexadecimal FF indicating the beam is fully on. In a second embodiment, shown by Table II, there are three intensity levels. The strength lookup table address locations are nominally set to either hexadecimal 00 indicating the beam is off, hexadecimal 7F indicating ½ intensity or hexadecimal FF indicating full intensity. In the third embodiment, shown by Table III, the strength lookup table has four nominal values. Hexadecimal 00 indicates the beam is off, hexadecimal 55 indicates ⅔ intensity level, hexadecimal AA indicates ⅓ intensity level and hexadecimal FF indicates full intensity. The output level of this circuit, the preferred embodiment, may be calculated using the following equation:

Output level = 0.8
V×(TTLDAC/255$_{10}$)×(OUTLEVEL/255$_{10}$)

In the above equation, 0.8 volts is the maximum output voltage level available for the circuit of the preferred embodiment. OUTLEVEL indicates the value obtained from the strength lookup table 520 of FIG. 5 and the TTLDAC value is obtained from a register which is set in the circuit in the present invention. The value of this register is used to factor the 0.8 V level of the circuit, to set the maximum value of the output. The register has a value between 0 and 255. Thus, the output resolution provided by the TTLDAC register is 3.14 mV (i.e. 0.8 volts divided by 255 levels).

The 8-bit value output from the strength lookup table 520 is provided as input to a buffer register 530 which holds the output of the strength lookup table of FIG. 5 stable during the table lookup access.

Thus, an apparatus which compensates for problems of astigmatism, isofocal bias and ellipticity in a pattern generation system has been described.

We claim:

1. In a pattern generation apparatus, said pattern generation apparatus having a radiant energy source for providing a radiant energy beam for generating a pattern on a workpiece, an improvement comprising an optical stigmator means for correcting astigmatism and ellipticity in said radiant energy beam;
    wherein said optical stigmator means comprises a plurality of optical lenses;
    wherein said plurality of optical lenses comprises:
        a first lens having a substantially convex surface oriented toward the source of said radiant energy beam and a substantially planar surface oriented away from the source of said radiant energy beam;
        a second lens having a substantially planar surface oriented toward the source of said radiant energy beam and a substantially cylindrical convex surface oriented away from the source of said radiant energy beam;
        a third lens having a substantially planar surface oriented toward the source of said radiant energy beam and a substantially convex surface oriented away from the source of said radiant energy beam;
        a fourth lens having a substantially planar surface oriented toward the source of said radiant energy beam and a substantially cylindrical concave surface oriented away from the source of said radiant energy beam.

2. The improvement, as recited in claim 1, wherein said radiant energy beam comprises a plurality of individual beams.

3. The improvement as recited in claim 1, wherein said first lens, said second lens and said third lens each have a refractive index of approximately 1.475.

4. The improvement as recited in claim 1, wherein said first lens, said second lens and said third lens are each approximately 0.2000 inches thick.

5. In a pattern generation apparatus, said pattern generation apparatus having a radiant energy source for providing a radiant energy beam, said radiant energy beam for generating a pattern on a workpiece, said pattern generation apparatus further having beam splitting means for splitting said radiant energy beam into a plurality of beams, said pattern generation system further having a modulation means for modulating said plurality of beams, an improvement comprising control means for controlling said modulation means, said control means comprising:
    a clock means for providing a first clock signal on a first line;
    delay generation means coupled with said first line for providing a second clock signal on a second line, said second clock signal delayed from said first clock signal;
    intensity level "generation" look-up means coupled to said delay generation means for providing an intensity level to said modulation means.

6. The improvement as recited by claim 5, wherein said delay generation means comprises:
    a state machine receiving, as input, intensity data and providing, as output, state data;
    delay look-up value means coupled with said state machine for storing delay information;
    delay generator means coupled with said delay lookup value means for generating a delayed clock signal.

7. The improvement as recited by claim 6, wherein said state machine comprises a shift register having as input intensity data for the immediately previous clock cycle.

8. The improvement as recited by claim 7, wherein said delay look-up means comprises a random access memory, said random access memory being addressed by state data supplied by said state machine.

9. The improvement as recited by claim 8, wherein said delay generator means comprises at least one timing edge vernier.

10. The improvement as recited by claim 8, wherein said delay generator means comprises:
- a D-Q latch;
- a first timing edge vernier coupled with a $\overline{Q}$ output of said D-Q latch, said $\overline{Q}$ output for providing a clock signal to said first timing edge vernier;
- a second timing edge vernier coupled with a $\overline{Q}$ output of said D-Q latch, said $\overline{Q}$ output for providing a clock signal to said second timing edge vernier.

11. In a pattern generation apparatus, said pattern generation apparatus for providing a radiant energy beam for generating a pattern on a workpiece, said pattern generation apparatus having a radiant energy source for providing said radiant energy beam, a beam splitter means for splitting said radiant energy beam into a plurality of beams, a modulation means for modulating said plurality of radiant energy beams, said modulation means for controlling presentation of said plurality of beams to said workpiece, an improvement for controlling problems of astigmatism, isofocal bias and ellipticity in said pattern generation system, the improvement comprising:
- an optical stigmator for correcting astigmatism and ellipticity in said pattern generation system; and
- a control means for controlling said modulation means, said control means for correcting for bias caused by non-linearities in the turning on and turning off of the beams, wherein said control means comprising:
- a clock means for providing a first clock signal on a first line;
- delay generation means coupled said first line for providing a second clock signal on a second line, said second clock signal delayed from said first clock signal;
- intensity level generation means coupled to said delay generation means for providing an intensity level to said modulation means.

* * * * *